United States Patent
Matsuo

(10) Patent No.: US 7,898,682 B2
(45) Date of Patent: Mar. 1, 2011

(54) PRINTING APPARATUS AND METHOD AND COMPUTER READABLE MEDIUM

(75) Inventor: Yasuhiro Matsuo, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1264 days.

(21) Appl. No.: 11/452,326

(22) Filed: Jun. 14, 2006

(65) Prior Publication Data

US 2007/0127060 A1 Jun. 7, 2007

(30) Foreign Application Priority Data

Dec. 5, 2005 (JP) ................................. 2005-351178

(51) Int. Cl.
G06F 3/12 (2006.01)
G06K 15/00 (2006.01)
H04N 1/40 (2006.01)

(52) U.S. Cl. ........................ 358/1.15; 358/1.16; 358/2.1

(58) Field of Classification Search ................. 358/1.15, 358/2.1, 1.16
See application file for complete search history.

(56) References Cited

U.S. PATENT DOCUMENTS

| | | | |
|---|---|---|---|
| 5,774,638 A | | 6/1998 | Kageyama et al. |
| 6,025,923 A | | 2/2000 | Kageyama et al. |
| 6,618,164 B1 | * | 9/2003 | Shima .......................... 358/1.15 |
| 6,697,898 B1 | * | 2/2004 | Shishizuka et al. ............ 710/107 |
| 6,876,465 B1 | * | 4/2005 | Morikawa et al. ........... 358/1.16 |
| 6,985,245 B1 | * | 1/2006 | Takahashi .................... 358/1.15 |
| 7,099,031 B2 | * | 8/2006 | Ogura et al. ................. 358/1.15 |
| 7,168,776 B2 | * | 1/2007 | Mitsuzawa ....................... 347/15 |
| 7,403,308 B2 | * | 7/2008 | Moro .............................. 358/2.1 |
| 7,535,592 B2 | * | 5/2009 | Niitsuma ...................... 358/1.16 |
| 7,808,658 B2 | * | 10/2010 | Hashimoto et al. ............ 358/1.1 |
| 2002/0039131 A1 | | 4/2002 | Terauchi et al. |
| 2002/0144162 A1 | | 10/2002 | Tada et al. |
| 2004/0169881 A1 | * | 9/2004 | Sato ............................. 358/1.15 |
| 2009/0051981 A1 | * | 2/2009 | Kuboki ........................ 358/474 |

FOREIGN PATENT DOCUMENTS

| | | |
|---|---|---|
| JP | A 10-289078 | 10/1998 |
| JP | A-2002-103749 | 4/2002 |
| JP | A-2002-113907 | 4/2002 |
| JP | A-2002-300332 | 10/2002 |
| JP | A-2003-067156 | 3/2003 |
| JP | A-2005-088288 | 4/2005 |

OTHER PUBLICATIONS

Nov. 30, 2010, Office Action issued in Japanese patent application No. 2005351178 (with translation).

* cited by examiner

*Primary Examiner* — James A Thompson
*Assistant Examiner* — Satwant K Singh
(74) *Attorney, Agent, or Firm* — Oliff & Berridge, PLC

(57) ABSTRACT

A printing apparatus includes one or more print processing sections that execute a printing process of printing an image represented by input printing image data onto a recording medium, and plural data processing sections that execute a generating process of generating the printing image data for inputting to the print processing section based on input data for a print subject. Further, the printing apparatus includes a control unit that inputs in a distributed manner the data for a print subject corresponding to a single printing job to plural data processing sections with the plural data processing sections executing in parallel the generating process for assigned parts of the data for a print subject.

15 Claims, 5 Drawing Sheets

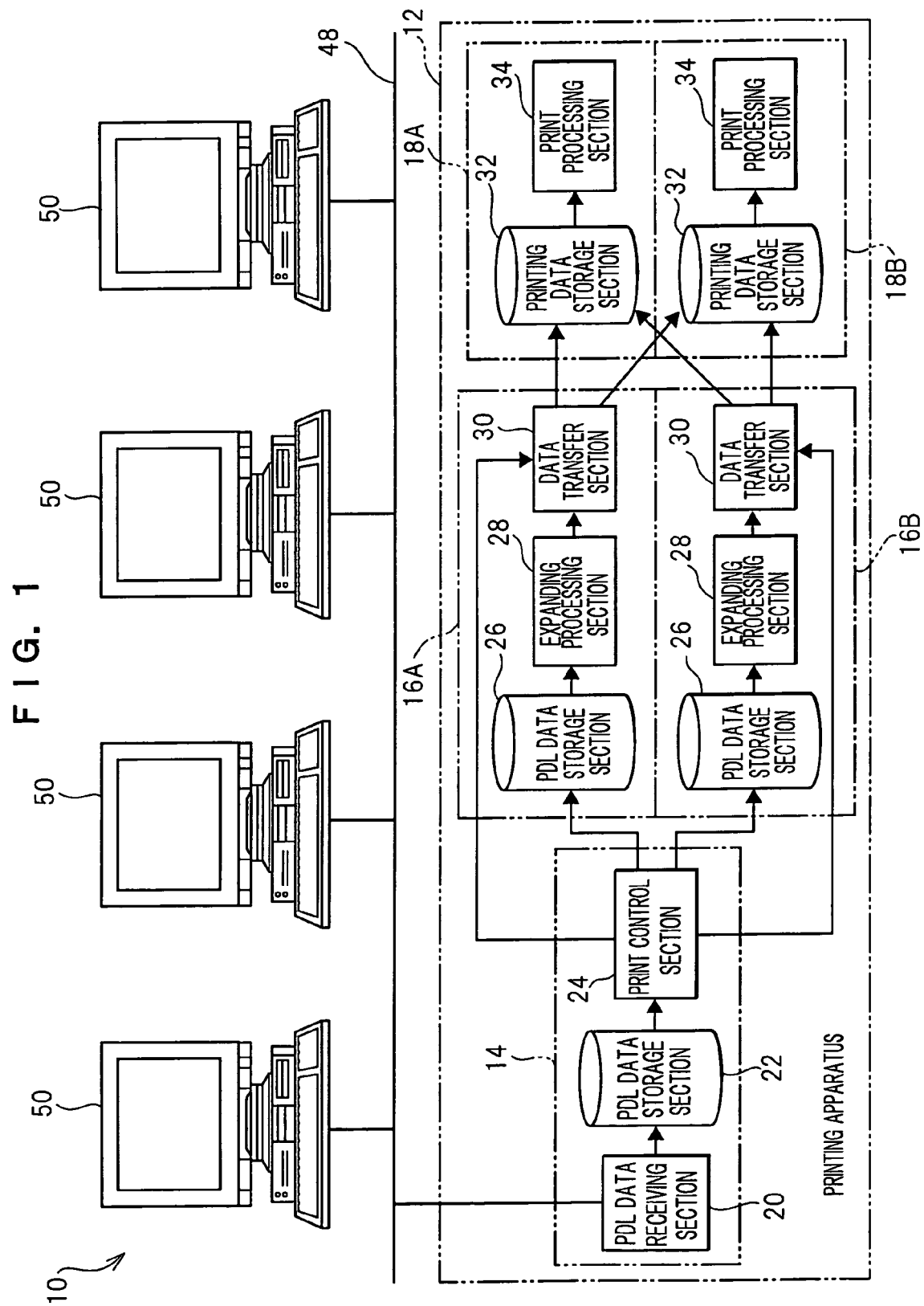

FIG. 2A   JOB EXECUTION PATTERN: 1C1E
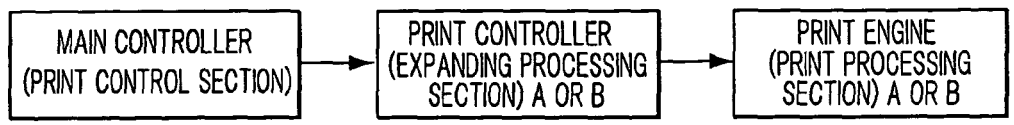
FIG. 2B   JOB EXECUTION PATTERN: 1C2E
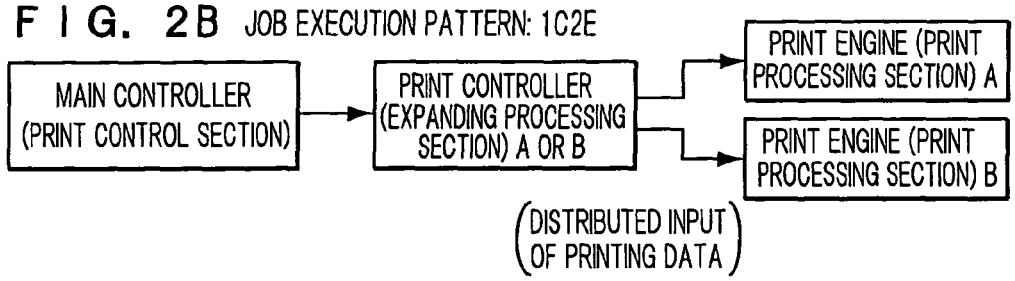
FIG. 2C   JOB EXECUTION PATTERN: 2C1E
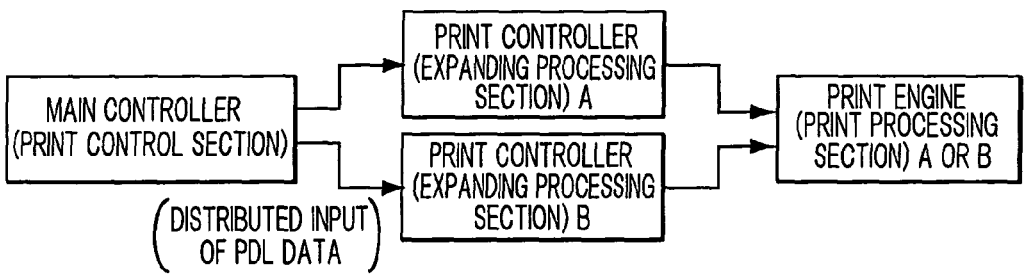
FIG. 2D   JOB EXECUTION PATTERN: 2C2E
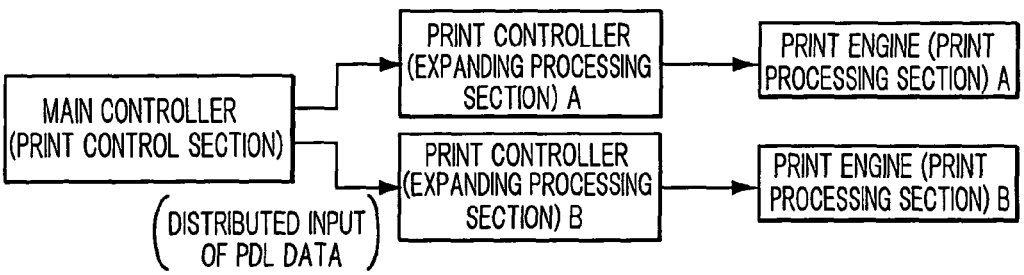
PROCESSING SPEED
  PRINTING JOB HAVING HIGH OUTPUT LOAD
   2C2E > 1C2E > 1C1E(2C1E)
  PRINTING JOB HAVING HIGH EXPANDING LOAD
   2C2E > 2C1E > 1C1E(1C2E)
POWER CONSUMPTION
   1C1E < 2C1E > 1C2E < 2C2E FIG. 3A PRINTING JOB HAVING HIGH OUTPUT LOAD Job-A

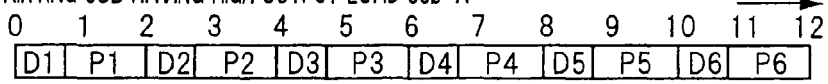

FIG. 3B CASE THAT Job-A IS PROCESSED BY 1C1E

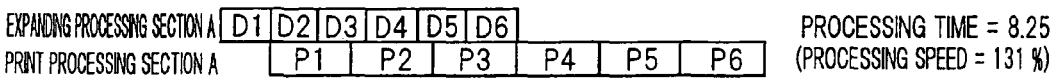

PROCESSING TIME = 8.25
(PROCESSING SPEED = 131 %)

FIG. 3C CASE THAT Job-A IS PROCESSED BY 1C2E

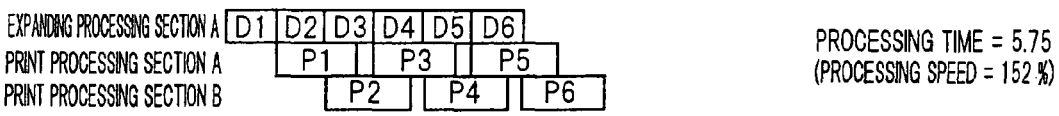

PROCESSING TIME = 5.75
(PROCESSING SPEED = 152 %)

FIG. 3D CASE THAT Job-A IS PROCESSED BY 2C1E

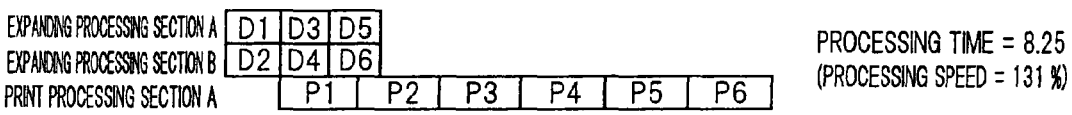

PROCESSING TIME = 8.25
(PROCESSING SPEED = 131 %)

FIG. 3E CASE THAT Job-A IS PROCESSED BY 2C2E

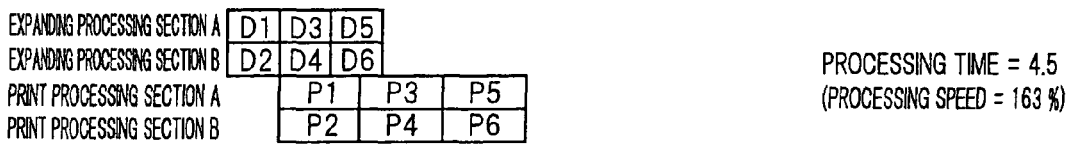

PROCESSING TIME = 4.5
(PROCESSING SPEED = 163 %)

FIG. 3F PRINTING JOB HAVING HIGH EXPANDING LOAD Job-B

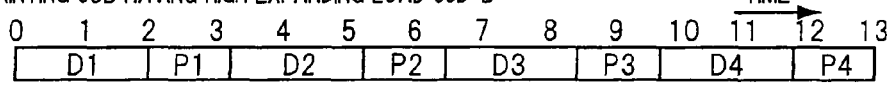

FIG. 3G CASE THAT Job-B IS PROCESSED BY 1C1E

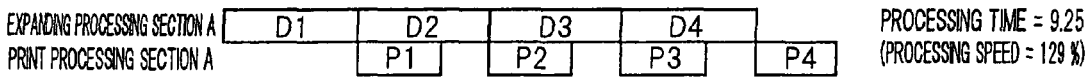

PROCESSING TIME = 9.25
(PROCESSING SPEED = 129 %)

FIG. 3H CASE THAT Job-B IS PROCESSED BY 1C2E

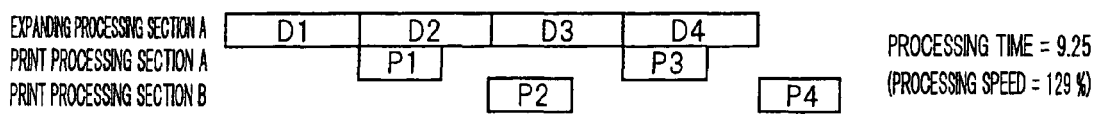

PROCESSING TIME = 9.25
(PROCESSING SPEED = 129 %)

FIG. 3I CASE THAT Job-B IS PROCESSED BY 2C1E

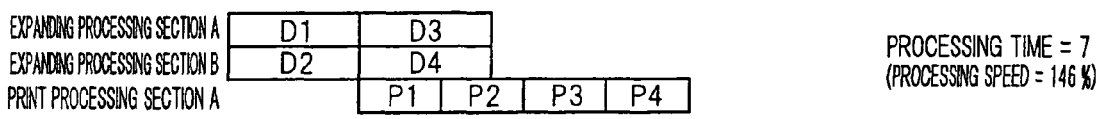

PROCESSING TIME = 7
(PROCESSING SPEED = 146 %)

FIG. 3J CASE THAT Job-B IS PROCESSED BY 2C2E

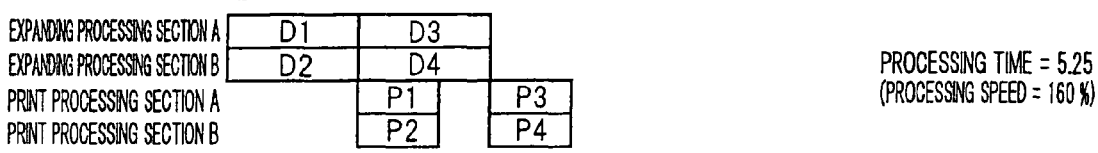

PROCESSING TIME = 5.25
(PROCESSING SPEED = 160 %)

IN THIS CASE, Di DENOTES EXPANDING PROCESS BY EXPANDING PROCESSING SECTION, Pi DENOTES PRINTING PROCESS BY PRINT PROCESSING SECTION AND i DENOTES INDIVIDUAL PAGE

PRINTING JOB HAVING A HIGH OUTPUT LOAD Job-A CORRESPONDS TO A PRINTING JOB IN WHICH PROCESSING TIME FOR EXPANDING PROCESS IS SHORT AND NUMBER OF PRINTED PAGES IS LARGE

PRINTING JOB HAVING A HIGH EXPANDING LOAD Job-B CORRESPONDS TO A PRINTING JOB IN WHICH PROCESSING TIME FOR EXPANDING PROCESS IS LONG AND NUMBER OF PRINTED PAGES IS SMALL

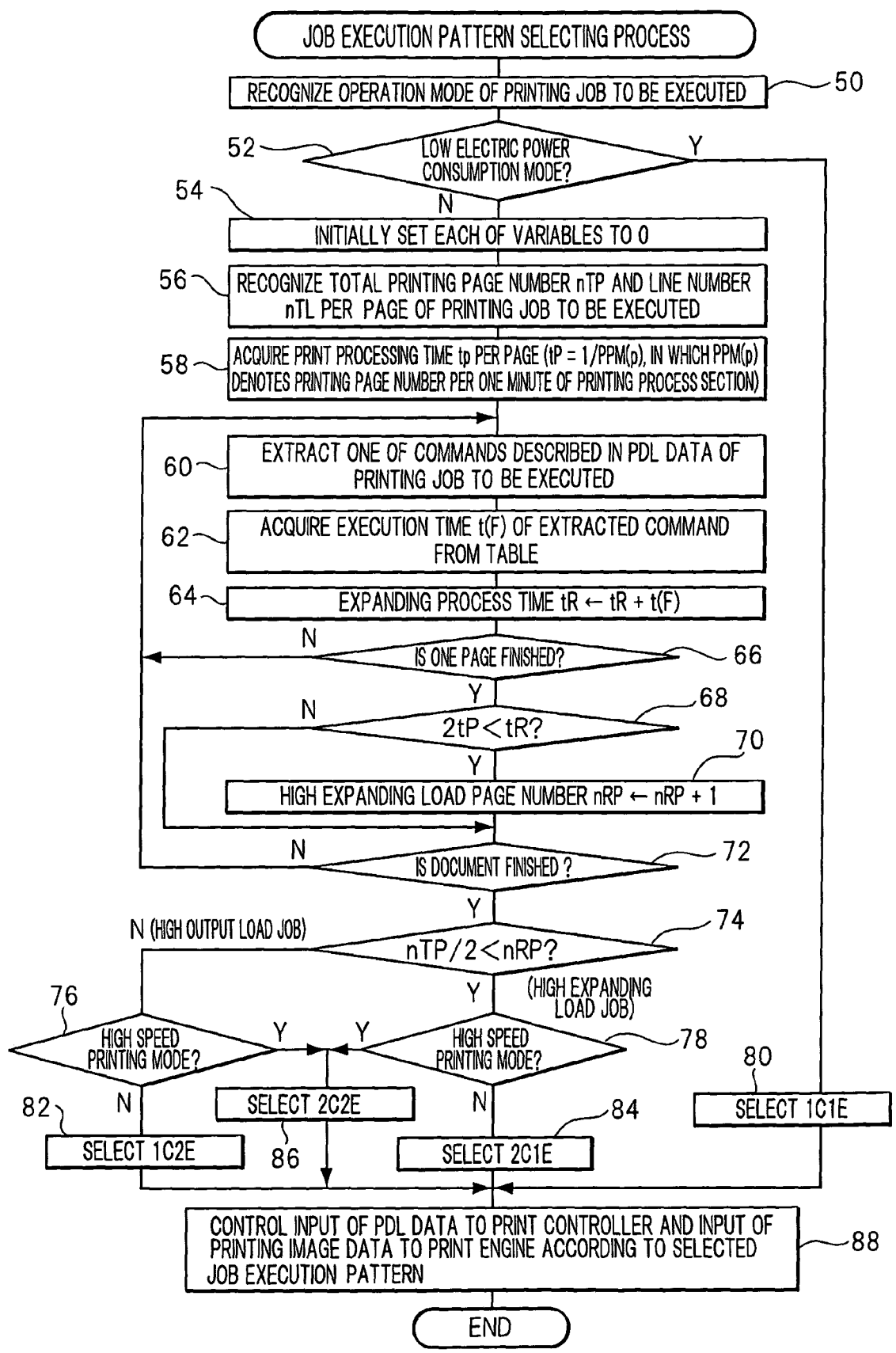

FIG. 5A CASE OF ONE PRINT CONTROLLER AND ONE PRINT ENGINE

|  | POWER CONSUMPTION: LOW | | POWER CONSUMPTION: HIGH | |
|---|---|---|---|---|
|  | LOW SPEED | MIDDLE SPEED | MIDDLE SPEED | HIGH SPEED |
| HIGH OUTPUT LOAD JOB | 1C1E | | | |
| HIGH EXPANDING LOAD JOB | 1C1E | | | |

FIG. 5B CASE OF ONE PRINT CONTROLLER AND TWO PRINT ENGINES

|  | POWER CONSUMPTION: LOW | | POWER CONSUMPTION: HIGH | |
|---|---|---|---|---|
|  | LOW SPEED | MIDDLE SPEED | MIDDLE SPEED | HIGH SPEED |
| HIGH OUTPUT LOAD JOB | 1C1E | | 1C2E | |
| HIGH EXPANDING LOAD JOB | 1C1E | | | |

FIG. 5C CASE OF TWO PRINT CONTROLLERS AND ONE PRINT ENGINE

|  | POWER CONSUMPTION: LOW | | POWER CONSUMPTION: HIGH | |
|---|---|---|---|---|
|  | LOW SPEED | MIDDLE SPEED | MIDDLE SPEED | HIGH SPEED |
| HIGH OUTPUT LOAD JOB | 1C1E | | | |
| HIGH EXPANDING LOAD JOB | 1C1E | 2C1E | | |

(SPEEDING UP OF PROCESSING SPEED OF HIGH EXPANDING LOAD JOB CAN BE ACHIEVED BY ARRANGING TWO PRINT CONTROLLERS)

FIG. 5D CASE OF TWO PRINT CONTROLLERS AND TWO PRINT ENGINES

|  | POWER CONSUMPTION: LOW | | POWER CONSUMPTION: HIGH | |
|---|---|---|---|---|
|  | LOW SPEED | MIDDLE SPEED | MIDDLE SPEED | HIGH SPEED |
| HIGH OUTPUT LOAD JOB | 1C1E | | 1C2E | 2C2E |
| HIGH EXPANDING LOAD JOB | 1C1E | 2C1E | | 2C2E |

(FURTHER SPEEDING UP OF PROCESSING SPEED OF EACH JOB CAN BE ACHIEVED BY ARRANGING TWO PRINT ENGINES, AND EXECUTION PATTERN OF EACH JOB CAN BE SELECTED FROM THREE KINDS OF EXECUTION PATTERNS)

PRINTING APPARATUS AND METHOD AND COMPUTER READABLE MEDIUM

This application claims priority under 35 USC 119 from Japanese Patent Application No. 2005-351,178, the disclosure of which is incorporated by reference herein.

TECHNICAL FIELD

The present invention relates to a printing apparatus and method, and a computer readable medium. More particularly, the present invention pertains to a printing apparatus structured such as to include a print processing section executing a printing process of printing an image on a recording medium, and a data processing section executing a generating process of generating a printing image data to be input to the print processing section, a printing method that executes a printing process of printing an image on a recording and a generating process of generating a printing image data, and a computer readable medium storing a program causing a computer to execute a process of printing.

RELATED ART

In a printing system in which a printing apparatus such as a printer or a complex machine having a function of a copying machine or the like mounted in a printer or the like is connected to a network, and a document or the like can be printed by the printing apparatus via the network from a personal computer (PC) or the like connected to the same network, when there is a possibility that a large quantity of documents are printed, a structure is often employed in which plural printing apparatuses are connected to the network. In such a structure, it is necessary to select and designate the printing apparatus which is to execute the printing at a time when the printing is instructed from the PC, and it is hard to ascertain an operating status or the like of the individual printing apparatus at the PC side, particularly in the case where the PC and the printing apparatus are installed at positions that are remote from each other. Hence, there are problems that the workload applied to the individual printing apparatus is not even, for example, the workload is concentrated to a specific printing apparatus, or the like, so that the printing efficiency is lower in consideration of the number of the installed printing apparatuses (for example, an average value of a print waiting time until the instructed print is finished after the print is instructed is longer in consideration of the number of the installed printing apparatuses).

SUMMARY

An aspect of the present invention provides a printing apparatus including: one or more print processing sections that execute a printing process of printing an image represented by input printing image data onto a recording medium; plural data processing sections that execute a generating process of generating the printing image data to be input to the print processing section based on input data for a print subject; and a control unit that inputs in a distributed manner the data for a print subject corresponding to a single printing job to the plural data processing sections with the plural data processing sections executing in parallel the generating process for assigned parts of the data for a print subject corresponding to the single printing job.

Other aspects, features and advantages of the present invention will become apparent from the following description taken in conjunction with the accompanying drawings.

BRIEF DESCRIPTION OF THE DRAWINGS

An embodiment of the present invention will be described in detail based on the following figures, in which:

FIG. 1 is a block diagram showing a schematic structure of the printing system according to an embodiment of the present embodiment;

FIGS. 2A to 2D are conceptual views showing job execution patterns which can be carried out by a printing apparatus;

FIGS. 3A to 3J are conceptual views respectively showing a processing sequence and a processing time (a processing speed) when a printing job having a high output load and a printing job having a high expansion load are performed in respective job patterns;

FIG. 4 is a flow chart showing the contents of a job execution pattern selecting process executed in a print control section of the printing apparatus; and FIGS. 5A to 5D are charts respectively showing job execution patterns which can be employed in cases where the expanding process section of the printing process and the print processing section are constituted by respective numbers of sections.

DETAILED DESCRIPTION

Detailed description will now be made of an embodiment of the present invention with reference to the accompanying drawings. FIG. 1 shows a printing system 10 according to the present embodiment. The printing system 10 comprises a printing apparatus 12 and personal computers (PC), or plural client PCs 50 connected to the printing apparatus 12 via a network 48 such as a LAN or the like.

The printing system 10 according to the present embodiment is structured such that a user can instruct a printing online to the printing apparatus 12 from a respective client PC 50, and the user operates the client PC 50 in which any suitable operating system (OS) and any suitable application software are installed, and a document to be printed (print subject) is prepared by utilizing a desired application software. The document to be printed may be a document consisting of characters alone, an image such as a photograph or a chart or the like, or a document in which the characters and the images are mixed. If the preparation of the document of the print subject is finished, the user executes an operation instructing the print of the document of the print subject. In this operation, there is simultaneously designated processing conditions (such as print copies, a size of a paper used for printing, an operating mode mentioned below and the like) of the printing job to be executed are also designated at the same time. If the operation mentioned above is executed by the user, attribute information indicating the processing conditions of the printing job set by the user is added, and the print subject data (hereinafter, refer to as a PDL data) obtained by describing the document of the print subject by a page description language (PDL) on a per-page basis is transmitted from the client PC 50 to the printing apparatus 12 via the network 48.

The printing apparatus 12 is provided with a main controller 14 controlling an operation of an entire of the printing apparatus 12, two print controllers 16A and 16B executing an expanding process of expanding the PDL data to printing image data, and two print engines 18A and 18B printing an image indicated by the printing image data on a paper on the basis of the printing image data input from the print controller 16, two print controllers 16A and 16B are respectively connected to the main controller 14. The two print engines 18A and 18B are connected to two print controllers 16A and 16B respectively. Meanwhile, at least the print engine 18A and the print engine 18B among them are accommodated within an separate casing, however, the main controller 14 and the print controllers 16A and 16B may be accommodated, for example, within the same casing as one of the print engines 18A and 18B. Alternatively, the print controller 16A and the print controller 16B may be accommodated within the same casing as that of the print engine 18A and the same casing as that of the print engine 18B, respectively, and the main controller 14 may be accommodated in the further different casing. The main controller 14 corresponds to a control unit according to the present invention; the print controller 16 corresponds to a data processing section according to the present invention; and the print engine 18 corresponds to a print processing section according to the present invention.

The main controller 14, which is formed by a computer including a CPU, a memory, and a nonvolatile storage device such as a hard disc drive (HDD) or the like, is structured functionally such that a PDL data receiving section 20, a PDL data storage section 22 and a print control section 24 are connected in sequence. The PDL data receiving section 20 receives the PDL data transmitted from the client PC 50 via the network 48, and sequentially stores the received PDL data in the PDL data storage section 22. The print control section 24 reads the PDL data stored in the PDL data storage section 22 on a per printing job basis, refers to an attribute information attached to the read PDL data, and executes an analysis of the PDL data as occasion demands, thereby selecting an execution pattern of the print job in correspondence to the read PDL data (a number of the print controller 16 and the print engine 18 used for printing: details will be described later), and executing a control by which the printing job is executed according to the selected execution pattern (the control includes the transfer of the PDL data to the print controller 16). In this case, a program by which the CPU of the computer executes the job execution pattern selecting process is installed in the storage device of the computer constituting the main controller 14, and the function mentioned above of the print control section 24 is achieved by the execution of the program by the CPU.

The print controllers 16A and 16B, which have the same structure, are constituted by a computer which, like main controller 14, includes CPU, memory and nonvolatile storage device and is functionally structured such that a PDL data storage section 26, an expanding processing section 28 and a data transferring section 30 are connected in the named order. The PDL data transferred to the print controller 16 from the print control section 24 of the main controller 14 is sequentially stored in the PDL data storage section 28. The expanding processing section 28 is equipped with a decomposer functioning as a PDL interpreting section and an imager, and has the functionality of a so-called RIP engine. It executes an expanding process of taking out the PDL data from the PDL data storage section 26 and interrupting, and expanding the PDL data to raster image data (bitmap type printing image data) on a per-page basis (since the print of the image to the paper is executed by using respective color materials having C, M, Y and K colors in the print engine 18 in the present embodiment, a color conversion from R, G and B to C, M, Y and K is simultaneously executed in this expanding process), and executes raster image processing (RIP), generating the printing image data usable for the print in the print engine 18. The function mentioned above of the expanding processing section 28 can be achieved by execution of a predetermined program by the CPU of the computer constituting the print controller 16. Further, the expanding process mentioned above corresponds to a generating unit according to the present invention.

The printing image data generated by the execution of the expanding process in the expanding processing section 28 is input to the data transfer section 30. The data transfer sections 30 of the print controllers 16A and 16B are respectively connected to the print engines 18A and 18B, and can transfer the input printing image data to any one of the print engines 18A and 18B. Further, the individual data transfer section 30 is also connected to the print control section 24 of the main controller 14, and transfers the input printing image data to the print engine 18 of the print engines 18A and 18B which is instructed from the print control section 24.

Further, the print engines 18A and 18B have the same structure with each other, and are constituted by a printing data storage section 32 sequentially storing the printing image data transferred from the data transfer section 30 of the print controller 16, and a print processing section 34 sequentially taking out the printing image data from the printing data storage section 32 and printing the image on the paper by using a plurality of color materials on the basis of the taken printing image data. In this case, the print processing section 34 is preferably structured such that the image is printed on the paper according to an electrophotographic method of forming an electrostatic latent image on a photo conductor by irradiating a light beam modulated in correspondence to the printing image data into the photo conductor, and transferring and fixing the toner image obtained by developing the formed electrostatic latent image by the toner on the paper, however, is not limited to this. It is possible to employ a structure in which the image is printed on the paper according to the other methods such as an ink jet method or the like.

Next, a description will be given of an operation of the present embodiment. Since the printing apparatus 12 according to the present embodiment is structured such that two print controllers 16 and two print engines 18 are provided, two print controllers 16A and 16B are connected to the main controller 14, and two print engines 18A and 18B are respectively connected to two print controllers 16A and 16B, it is possible to select an optional job execution pattern from four kinds of job execution patterns shown in FIGS. 2A to 2D, as the execution pattern of the printing job.

A first job execution pattern shown in FIG. 2A corresponds to a pattern in which one print controller 16 and one print engine 18 are used, the PDL data is input only to one print controller 16 from the main controller 14, and the printing image data is input only to one print engine 18 from the print controller 16. This pattern is hereinafter called as "1C1E". Further, a second job execution pattern shown in FIG. 2B corresponds to a pattern in which one print controller 16 and two print engines 18 are used, the PDL data is input only to one print controller 16 from the main controller 14, and the printing image data is input in a distributed manner to two print engines 18A and 18B from the print controller 16. This pattern is hereinafter called as "1C2E".

Further, a third job execution pattern shown in FIG. 2C corresponds to a pattern in which two print controllers 16 and one print engine 18 are used, the PDL data is input in a distributed manner to two print controllers 16A and 16B from the main controller 14, and the printing image data is input only to one print engines 18 from the print controllers 16A and 16B. This pattern is hereinafter called as "2C1E". Further, a fourth job execution pattern shown in FIG. 2D corresponds to a pattern in which two print controllers 16 and two print engines 18 are used, the PDL data is input in a distributed manner to two print controllers 16A and 16B from the main controller 14, and the printing image data is respectively input to two print engines 18A and 18B from the print controllers 16A and 16B. This pattern is hereinafter called as "2C2E".

The individual job execution patterns mentioned above are provided with different features from each other, and a processing speed (a processing time) and an electric power consumption of the printing apparatus 12 are varied depending on in which execution pattern the printing apparatus 12 executes the printing job.

As one example, as shown in FIG. 3A, there is compared a case of executing a printing job Job-A having a high output load in which a processing time in units of page of the expanding process (D1, D2, . . . ) executed by (the expanding processing section 28 of) the print controller 16 is shorter in comparison with a processing time in units of page of the printing process (P1, P2, . . . ) executed by (the print processing section 34 of) the print engine 18, and a number of printing pages is large (the number of the printing page is set to 6 in FIG. 3A, however, in reality the number of the printing pages is likely to be more).

In the printing job Job-A having the high output load shown in FIG. 3A, the processing time in the case where sequentially executing the expanding process and the printing process of each of the pages are sequentially executed becomes "12" (refer to FIG. 3A), and when the job Job-A is executed by 1C1E, the expanding process in the print controller 16 and the printing process in the print engine 18 can be executed in parallel as shown in FIG. 3B (RIP While Run), but since one print controller 16 and one print engine 18 are provided, the processing time becomes "8.25" (refer to FIG. 3B). Further, in the case of executing the Job-A by 1C2E, since the printing process can be shared by two print engines 18 so as to be executed in parallel as shown in FIG. 3C, the processing time becomes "5.75", and the processing time can be shortened in comparison with 1C1E. On the other hand, in the case of executing the Job-A by 2C1E, the expanding process can be shared by two print controllers 16 so as to be executed in parallel as shown in FIG. 3D, however, the printing process becomes a bottleneck in the printing job Job-A having the high output load. Accordingly, the parallel execution of the expanding process does not contribute to the shortening operation of the processing time, and the processing time becomes "8.25" which is the same as that in 1C1E. Further, in the case of executing the Job-A by 2C2E, since the expanding process can be shared by the two print controllers 16 so as to be executed in parallel as shown in FIG. 3E, and the printing process can be shared by two print engines 18 so as to be executed in parallel, the processing time becomes "4.5", and the processing time can be shortened in comparison with 1C2E.

Next, as shown in FIG. 3F, there is compared a case of executing a printing job Job-B having a high expanding load in which a processing time in units of page of the expanding process (D1, D2, . . . ) executed by (the expanding processing section 28 of) the print controller 16 is longer in comparison with a processing time in units of page of the printing process (P1, P2, . . . ) executed by (the print processing section 34 of) the print engine 18.

In the printing job Job-B having the high expanding load shown in FIG. 3F, the processing time at a time of sequentially executing the expanding process and the printing process of each of the pages becomes "13" (refer to FIG. 3F), however, in the case of executing the job Job-B by 1C1E (refer to FIG. 3G), the processing time becomes "9.25" because one print controller 16 and one print engine 18 are provided. Further, in the case where the Job-B is executed by 1C2E, it is possible to share the printing process by two print engines 18 so as to execute the printing process in parallel as shown in FIG. 3H, however, since the expanding process becomes a bottleneck in the printing job Job-B having the high expanding load, the parallel execution of the printing process does not contribute to the shortening operation of the processing time, and the processing time becomes "9.25" which is the same as that in 1C1E. On the other hand, in the case of executing the Job-B by 2C1E, since it is possible to share the expanding process forming the bottleneck by two print controllers 16 so as to execute in parallel as shown in FIG. 3I, the processing time becomes "7" and the processing time can be shortened in comparison with 1C1E. Further, in the case of executing the Job-B by 2C2E, since the expanding process can be shared by the two print controllers 16 so as to be executed in parallel as shown in FIG. 3J, and the printing process can be shared by two print engines 18 so as to be executed in parallel, the processing time becomes "5.25", and the processing time can be shortened in comparison with 2C1E.

Accordingly, with regard to the processing speed (the processing time), as shown in FIG. 2, in the case of executing the printing job having the high output load, the relation "2C2E>1C2E>1C1E (2C1E)" is established, and in the case of executing the printing job having the high expanding load, the relation "2C2E>2C1E>1C1E (1C2E)" is established. Further, with regard to the electric power consumption, since the electric power consumption is much greater in the print engine 18 than in the print controller 16, the relation "1C1E<2C1E<1C2E<2C2E" is established as shown in FIG. 2 whichever of the printing job having the high output load or the printing job having the high expanding load the executed printing job is.

As mentioned above, even in the case of executing the same printing job, the printing apparatus 12 according to the present embodiment can switch the processing speed (the processing time) and the electric power consumption by switching the job execution pattern. In order to make it possible to execute the print satisfying the user's needs relating to the processing speed (the processing time) and the electric power consumption, "normal mode", "low electric power consumption mode" and "high speed printing mode" are provided as an operation mode of the printing apparatus 12 in the present embodiment. The operation mode can be selected and set by the user at a time when the user executes an operation of instructing the printing of the printed document via the client PC 50.

Next, a description will be given of a job execution pattern selecting process executed by the print control section 24 of the main controller 14 when the printing apparatus 12 starts executing a new printing job with reference to FIG. 4. In a step 50, the step reads the PDL data of the printing job to be executed in the memory from the PDL data storage section 22, and refers to the operation mode information indicating the operation mode selected and set by the user in the attribute information attached to the read PDL data, thereby recognizing the operation mode selected and set by the user with respect to the printing job to be executed. In the next step 52, the step determines whether the operation mode set with respect to the printing job to be executed corresponds to "low electric power consumption mode".

As mentioned above, with regard to the electric power consumption, since "1C1E" is the minimum whichever of the printing job having the high output load or the printing job having the high expanding load the printing job to be executed is, the step goes to a step 80 in the case where the determination of the step 52 is affirmed. Then, the step selects "1C1E" as the job execution pattern with respect to the printing job to be executed. Further, in the next step 88, the step executes a process of controlling the input of the PDL data to the print controller 16 and the input of the printing data to the print engine 18, according to the selected job execution pattern.

In other words, in the case where the selected job execution pattern corresponds to "1C1E", the step controls the data transfer section 30 of the print controller 16 to which the PDL data is input, in such a manner as to input the PDL data of the printing job to be executed alphabetically read from the PDL data storage section 22 only to one of two print controllers 16A and 16B, and transfer and input the printing image data generated and output by the execution of the expanding process by the expanding processing section 28 of the print controller 16 to which the PDL data is input only to one of two print engines 18A and 18B. Accordingly, the printing job to be executed is executed according to the execution pattern of "1C1E", and the document to be printed is printed by the low electric power consumption though the comparatively low processing speed, as shown in FIG. 3B or 3C.

On the other hand, in the case where the determination in the step 52 is denied (in the case where the operation mode set with respect to the printing job to be executed corresponds to "normal mode" or "high-speed printing mode"), the step goes to a step 54, the step initially sets each of variables (an expanding process time tR, a high expanding load page number nRP and the like) used in the following processes to 0. In the next step 56, the step recognizes a total printing page number nTP of the printing job to be executed and a line number nTL per page by referring to the PDL data of the printing job to be executed read in the memory in the previous step 50. Further, in the present embodiment, the printing process time tP per one page in the printing process by the printing process section 34 is previously computed so as to be stored in the nonvolatile storage device, and the printing process time tP is acquired from the nonvolatile storage device in a step 58. In this case, on the assumption that the printing page number per one minute in the printing process by the printing process section 34 is set to PPM(p), the printing process time tP can be obtained by computing an inverse number of the printing page number PPM(P) (tP=1/PPM(p)).

In a step 60, the PDL data of the printing job to be executed read in the memory in the step 50 is scanned sequentially from the data corresponding to a head line in a head page of the document to be printed corresponding to the printing job, and one command appearing first in the scan is taken out. Various commands are described in the PDL data, however, in the present embodiment, in the expanding process by the expanding processing section 28, an execution time t(F) when a predetermined process is executed according to the individual commands described in the PDL data is previously stored as a command execution time table (refer, for example, to the following Table 1) set per each of the individual commands describable in the PDL data, in the nonvolatile storage apparatus, and in a step 62, the step acquires the execution time t(F) corresponding to the command acquired in the step 60 from the command execution time table described below.

<Command execution time table>

| No | Command | Execution time t(F) [ns] |
|---|---|---|
| 1 | Font( ) | 1 |
| 2 | Line( ) | 1 |
| 3 | BMP( ) | 3 |
| 4 | Fill( ) | 3 |
| 5 | Triangle( ) | 4 |

-continued

<Command execution time table>

| No | Command | Execution time t(F) [ns] |
|---|---|---|
| 6 | Circle( ) | 5 |
| 7 | Trapping( ) | 8 |
| 8 | Transparency( ) | 10 |
| . | . | . |
| . | . | . |
| . | . | . |
| N | Print Ready( ) | 1 |

Further, in a step 64, the execution time t(F) acquired in the step 62 is added to the expanding process time tR initially set to 0 in the previous step 54 (tR←tR+t(F)). In the next step 66, the step determines whether the process (the acquirement of the command and the renewal of the expanding process time tR) with respect to the PDF data for one page is finished. The determination can be achieved by determining whether the data from which the command is taken out in the step 60 is a data corresponding to a final line and all the commands described in the data corresponding to the final line are acquired. Further, the determination whether the data is the final line can be executed on the basis of the line number nTL per page recognized in the previous step 56. In the case where the determination of the step 66 is denied, the step goes back to the step 60, and the steps 60 to 66 are repeated until the determination of the step 66 is affirmed. Accordingly, the execution time t(F) of each of the commands described in the PDL data corresponding to a certain page of the document to be printed is integrated, whereby the time required for the expanding process with respect to the PDL data corresponding to the certain page is forecasted and computed.

When processing with respect to the PDF data for one page is finished, whereby the determination in the step 66 is affirmed, the step goes to a step 68, and the step determines whether the expanding process time tR obtained by the process mentioned above is larger than the value obtained by multiplying the printing process time tP acquired in the previous step 58 by 2 (2tP<tR). In this step 68, the step determines whether the corresponding page corresponds to the page having the high expanding load in which a lot of time is required for the expanding process. In the case where the determination is affirmed, the step goes to a step 70, increments the high expanding load page number nRP initially set to 0 in the previous step 54 by 1 (nRP←nRP+1), and goes to a step 72. Further, in the case where the determination of the step 68 is denied, the step goes to the step 72 while skipping the step 70. In this case, the determination whether being the page of the high expanding load is not limited to the determination executed on the basis of the matter that whether the expanding process time tR is larger than the value obtained by multiplying the printing process time tP by 2 as in the step 68, but may be executed by using the other coefficients than 2 (for example, a value equal to or more than 1).

In the next step 72, the step determines whether the process mentioned above is executed for all the pages of the document to be printed by determining whether the page in which the expanding process time tR is forecast and computed by the process mentioned above corresponds to the final page of the document to be printed. In this case, the determination in the step 72 whether being the final page can be executed on the basis of the total print page number nTP recognized in the previous step 56. In the case where the determination is denied, the step goes back to the step 60, and the steps 60 to 72 are repeated until the determination of the step 72 is affirmed. Accordingly, the forecasting and computation of the expanding process time tR is executed about all the pages of the document to be printed, and the high expanding load page number nRP is renewed on the basis of the forecasted and computed result of the expanding process time tR.

If the determination of the step 72 is affirmed, the step goes to a step 74, and determines whether the high expanding load page number nRP obtained by the process mentioned above is larger than the number obtained by dividing the total printing page number nTP by 2 (nTP/2<nRP), that is, a proportion of the high expanding load pages in all the pages of the document to be printed is larger than 50%. In the step 74, the step determines whether the printing job of printing the document to be printed corresponds to the printing job having the high expanding load. In the case where the determination of the step 74 is affirmed, it is possible to determine that the printing job to be executed corresponds to the printing job having a high expanding load, and in the case where the determination of the step 74 is denied, it is possible to determine the printing job to be executed corresponds to the printing job having the high output load.

In a case where the determination of the step 74 is determined in the negative, the step goes to a step 76, and determines whether the operation mode recognized in the previous step 50 corresponds to "high-speed printing mode". As previously described, since the processing speed at a time of executing a printing job having a high output load is maximized by "2C2E", the step goes to a step 86 in the case where the determination of the step 76 is affirmed (in the case where the printing job to be executed corresponds to the printing job having the high output load and the operation mode corresponds to "high-speed printing mode"), and selects "2C2E" as the job execution pattern with respect to the printing job to be executed.

In this case, in the next step 88, the step inputs in a distributed manner the PDL data of the printing job to be executed sequentially read from the PDL data storage section 22 to two print controllers 16A and 16B per page, and executes the process of controlling the data transfer sections 30 of the print controllers 16A and 16B in such a manner that the printing image data output from the print controller 16A is transferred and input to the print engine 18A, and the printing image data output from the print controller 16B is transferred and input to the print engine 18B. Accordingly, the printing job to be executed (the printing job having the high output load) is executed according to the execution pattern of "2C2E", and the document to be printed is printed at the maximum printing speed, although with a high electric power consumption, as shown in FIG. 3J.

Further, in the case where the determination of the step 76 is in the negative (in the case where the printing job to be executed is a printing job having a high output load and the operation mode is "normal mode"), the step goes to a step 82, where "1C2E" is selected as the job execution pattern with respect to the printing job to be executed. In this case, in the next step 88, a process of controlling the data transfer section 30 of the print controller 16 to which the PDL data is input is executed in a manner such that the PDL data of the printing job to be executed, which are sequentially read from the PDL data storage section 22, are input to one of the two print controllers 16A and 16B, and the printing image data output from the print controller 16 to which the PDL data is transferred and input to the two print engines 18A and 18B while being distributed thereto on a page unit basis. Thus, the printing job to be executed (the printing job having the high output load) is executed according to the execution pattern of "1C2E", and the document to be printed is printed at a higher speed than in the case of "1C1E" and with a lower power consumption than in the case of "2C2E", as shown in FIG. 3I.

On the other hand, if the printing job to be executed is a printing job having a high expanding load, the determination in the step 74 is in the affirmative, and the step goes to the step 78, and determines whether the operation mode recognized in the previous step 50 corresponds to "high-speed printing mode". As previously described, since the processing speed at a time of executing the printing job having the high output load is maximized with "2C2E", the step goes to a step 86 in a case where the determination in the step 78 is in the affirmative (in the case where the printing job to be executed corresponds to a printing job having a high expanding load and the operation mode corresponds to "high-speed printing mode"). In the step 86, "2C2E" is selected as the job execution pattern with respect to the printing job to be executed.

In this case, in the next step 88, the step inputs in a distributed manner the PDL data of the printing job to be executed, which are sequentially read from the PDL data storage section 22, are input in a distributed manner to the two print controllers 16A and 16B on a page unit basis, and the process of controlling the data transfer sections 30 of the print controllers 16A and 16B is executed in a manner such that the printing image data output from the print controller 16A is transferred and input to the print engine 18A, and the printing image data output from the print controller 16B is transferred and input to the print engine 18B. Thus, the printing job to be executed (a printing job having a high expanding load) is executed according to the execution pattern of "2C2E", and the document to be printed is printed at the maximum printing speed, although with high electric power consumption, as shown in FIG. 3K.

Further, in the case where the determination of the step 78 is in the negative (in the case where the printing job to be executed corresponds to a printing job having a high expanding load and the operation mode corresponds to "normal mode"), the step goes to a step 84, where "2C1E" is selected as the job execution pattern with respect to the printing job to be executed. In this case, in the next step 88, a process of controlling the data transfer section 30 of the print controllers 16A and 16B is executed in a manner such that the PDL data of the printing job to be executed, which are sequentially read from the PDL data storage section 22, are input in a distributed manner to the two print controllers 16A and 16B on a page unit basis, and the printing image data output from the print controllers 16A and 16B is transferred and input to only one of two print engines 18A and 18B. Thus, the printing job to be executed (a printing job having a high expanding load) is executed according to the execution pattern of "2C1E", and the document to be printed is printed at a higher speed than in the case of "1C1E" and with a lower power consumption than in the case of "2C2E", as shown in FIG. 3J.

Since the execution pattern selecting process mentioned above is executed on an individual printing job unit basis, the job execution pattern is selected from among "1C1E", "1C2E", "2C1E" and "2C2E" on an individual printing job unit basis depending on whether the individual printing job set by the user is a printing job having a high output load or a printing job having a high expanding load.

Next, a description will be given of the relationship between the number of the print controller 16 and the print engine 18, and the achievable job execution patterns. In the case where the number of the print controller 16 and the number print engine 18 are respectively one, the achievable job execution pattern is "1C1E" alone. Therefore, in this structure, as shown in FIG. 5A, there is no alternative but to employ "1C1E" as the job execution pattern, whether the printing job to be executed is the printing job having the high output load or the printing job having the high expanding load.

Further, in the case where the number of the print controller 16 is one and the number of the print engines 18 is two, the achievable job execution patterns are "1C1E" and "1C2E". In this structure, the job execution pattern can be selected from "1C1E" and "1C2E" in the case where the printing job to be executed is the printing job having the high output load, as shown in FIG. 5B. In the case where the printing job to be executed is a printing job having a high expanding load, the processing speed improving effect that can be obtained with "1C2E" is not significant compared with that that can be obtained with "1C1E", and the power consumption is increased in the case of "1C2E" to more than in the case of "1C1E", as can be seen from a comparison of FIGS. 3G and 3H. Thus, "1C1E" as the job execution pattern in the case where the printing job to be executed is the printing job having high expanding load should be used.

In contrast, in the case where two print controllers 16 and one print engine 18 are provided, achievable job execution patterns are "1C1E" and "2C1E", and in the case where the printing job to be executed is the printing job having the high output load (this structure is included in the scope of the present invention), the processing speed improving effect that can be obtained with "2C1E" is not significant as compared with that that can be obtained with "1C1E", and the power consumption is increased in the case of "2C1E" to more than in the case of "1C1E", as can be seen from a comparison of FIGS. 3B and 3D. Thus, there is "1C1E" should be employed as the job execution pattern in the case where the printing job to be executed is the printing job having the high output load. On the other hand, in this structure, as shown in FIG. 5C, in the case where the printing job to be executed is the printing job having the high expanding load, it is possible to select the job execution pattern from "1C1E" and "2C1E", and it is also possible to achieve "speed-up of the printing job having the high expanding load", as can be seen from a comparison of FIGS. 3G and 3H, something which is not achieved by the structure corresponding to FIGS. 5A and 5B.

Further, in the case where two print controllers 16 and two print engines 18 are provided, the achievable job execution pattern becomes as many as four, i.e., "1C1E", "1C2E", "2C1E" and "2C2E". Further, in this structure, as shown in FIG. 5D, in the case where the printing job to be executed is a printing job having a high output load, the job execution pattern can be selected from among three types such as "1C1E", "1C2E" and "2C2E". In the case where the printing job to be executed is the printing job having a high expanding load, the job execution pattern can be selected from among three types such as "1C1E", "2C1E" and "2C2E". Thus, whether the printing job to be executed is the printing job having the high output load or the printing job having the high expanding load, it is possible to achieve a further speeding-up of the printing job by employing "2C2E". Further, by employing "1C2E" in the case of the printing job having a high output load, and by employing "2C1E" in the case of the printing job having a high expanding load, it is possible to execute the printing job at a higher speed than by employing "1C1E", while at the same suppressing the power consumption more than by employing "2C2E".

Meanwhile, in a job execution pattern selecting process shown in FIG. 4, in the case where the operation mode set with respect to the printing job to be executed is other than the low power consumption mode, it is determined, by executing an analysis of the PDL data, whether the printing job to be executed is the printing job having the high output load or the printing job having the high expanding load. However, since the job execution pattern having the maximum processing speed corresponds to "2C2E", whether the printing job to be executed is the printing job having the high output load or the printing job having the high expanding load, it is possible to omit the analysis of the PDL data by determining whether the operation mode set with respect to the printing job to be executed corresponds to the printing mode having the high speed printing mode before executing the analysis of the PDL data, and by selecting "2C2E" as the job execution pattern with respect to the printing job to be executed in the case where the determination is in the affirmative, as in the low power consumption mode.

The function described in the above embodiment of the present invention can be implemented also by a program which can be executed by a computer. In this case, the program and data which the program uses can also be stored on a storage medium readable by a computer, or supplied via cable or radio communication.

Although in the foregoing, description has been made of the structure provided with the computer (the main controller 14) that serves as the control unit according to the present invention, the present invention the structure is by no means limited thereto, and a structure may also be employed in which the computer (main controller 14) is omitted and one of the plural computers (the print controllers 16A and 16B) that serve as the generation unit according to the present invention is made to serve as the control unit according to the present invention. In this case, one print controller of the print controllers 16A and 16B which also serves as the control unit functions as a master, whereas the other print controller functions as a slave, and the invention can be realized by print subject data such as the PDL data being transferred from the master (the print controller 16 thereof) to the slave (the print controller 16 thereof) as occasion demands.

Further, although in the foregoing, description has been made of the aspect in which the operation mode is set per an individual printing job by the user, the present invention is by no means limited thereto. A structure may be used in which the default operation mode is preset in the printing apparatus 12 and the operation mode is set with respect to a specific printing job only at the necessary time. Further, a structure may also be used in which a priority scheme is used instead of the operation mode; and with respect to a printing job having high priority, the job execution pattern having the highest speed is selected and printing is executed by moving the job up the job executing order, while with respect to a printing job having low priority, printing is executed with a job execution pattern having the low power consumption and by moving the job down the job executing order.

Further, although in the foregoing, by way of example, description has been made of the printing apparatus 12 structured such that two print controllers 16 and two print engines 18 are provided, the present invention is by no means limited thereto, and more print controllers 16 and more print engines 18 may be provided. Accordingly, the number of kinds of the selectable job execution patterns is increased, and it is possible to switch the job execution pattern with precision in correspondence to the required level relating to the processing speed and the electric power consumption. Further, as mentioned above, the present invention includes the structure in which a plurality of print controllers 16 are provided and only one print engine 18 is provided, as the scope of the invention. Accordingly, there can be obtained an effect in which it is possible to achieve the speeding up of a printing job having a high expanding load, even in this structure.

What is claimed is:

1. A printing apparatus comprising:
   one or more print processing sections that execute a printing process of printing an image represented by input printing image data onto a recording medium;
   a plurality of data processing sections that execute a generating process of generating the printing image data to be input to the print processing section based on input data for a print subject; and
   a control unit that inputs in a distributed manner the data for the print subject corresponding to a single printing job to the plurality of data processing sections with the plurality of data processing sections executing in parallel the generating process for assigned parts of the data for the print subject corresponding to the single printing job,
   wherein the data for the print subject corresponds to collated data of a plurality of pages of page data that describe an image to be printed on a single page of the recording medium, and the control unit forecasts a printing processing time of the generating process for the data for the print subject for each of the plurality of pages of page data, determines if a proportion of the number of pages of page data in which the forecasted printing processing time of the generating process is larger than a first predetermined value with respect to a total number of pages of the print data is larger than a second predetermined value, selects inputting in a distributed manner the data for a print subject corresponding to the single printing job to the plurality of data processing sections in a case where the proportion is determined to be larger than the second predetermined value, and selects inputting the data for a print subject corresponding to the single printing job to only a specific data processing section in a case where the proportion is determined to be equal to or less than the second predetermined value, and executes the inputting of the data for a print subject to the data processing section in accordance with a result of the selection.

2. A printing apparatus as claimed in claim 1, wherein the data for a print subject is collated data of a plurality of pages of page data that describe an image to be printed on a single page of the recording medium, and the control unit inputs in a distributed manner to the plurality of data processing sections the data for a print subject corresponding to the single printing job with the page data as a unit.

3. A printing apparatus as claimed in claim 1, wherein the control unit: in a case where an operation mode set via a setting unit is not an operation mode that gives priority to a reduction of power consumption selects inputting in a distributed manner the data for a print subject corresponding to the single printing job to the plurality of data processing sections in a case where the proportion is determined to be larger than the second predetermined value or selects inputting the data for a print subject corresponding to the single printing job to only a specific data processing section in a case where the proportion is determined to be equal to or less than the second predetermined value; and in a case where the operation mode set via the setting unit is an operation mode giving priority to the reduction of the electric power consumption selects inputting the data for the print subject corresponding to the single printing job to only the specific data processing section; and executes inputting the data for the print subject to the data processing section in accordance with a result of the selection.

4. A printing apparatus as claimed in claim 1, wherein in a the control unit: selects inputting in a distributed manner the data for the print subject corresponding to the single printing job in which priority represented by priority information that is set per printing job via a setting unit is equal to or higher than a predetermined value to a plurality of data controllers; selects inputting the data for the print subject corresponding to the single printing job in which the priority represented by the priority information is lower than the predetermined value to only a specific data controller; and executes inputting the data for the print subject to the data processing section in accordance with a result of the selection.

5. A printing apparatus as claimed in claim 1, further comprising: a switching unit provided with a plurality of the print processing sections, and capable of switching the print processing section to which the printing image data generated by a data processing section is input for each data processing section;
   wherein when an operation mode set via a setting unit is not an operation mode that gives priority to a reduction of power consumption the control unit controls the switching unit and the printing process corresponding to a single printing job is assigned in parts to the plurality of print processing sections and executed in parallel, by inputting in a distributed manner the printing image data generated by the data processing section(s) to the plurality of data processing sections; and
   when the operation mode set via the setting unit is an operation mode that gives priority to the reduction of power consumption the control unit controls the switching unit with the printing process corresponding to a single printing job executed by only a specific data processing section, by inputting the printing image data generated by the data processing section(s) only to the specific print processing section.

6. A printing apparatus as claimed in claim 2, further comprising: a switching unit provided with a plurality of the print processing sections, and capable of switching the print processing section to which the printing image data generated by a data processing section is input for each data processing section;
   wherein when an operation mode set via a setting unit is not an operation mode that gives priority to a reduction of power consumption the control unit controls the switching unit and the printing process corresponding to a single printing job is assigned in parts to the plurality of print processing sections and executed in parallel, by inputting in a distributed manner the printing image data generated by the data processing section(s) to the plurality of data processing sections; and
   when the operation mode set via the setting unit corresponds to an operation mode that gives priority to a reduction of power consumption the control unit controls the switching unit and the printing process corresponding to the same printing job is executed by only a specific data processing section, by inputting the printing image data generated by the data processing section(s) only to the specific print processing section.

7. A printing apparatus as claimed in claim 1, further comprising: a switching unit provided with a plurality of the print processing sections, and capable of switching the print processing section to which the printing image data generated by a data processing section is input for each data processing section;
   wherein when an operation mode set via a setting unit is not an operation mode that gives priority to a reduction of power consumption the control unit controls the switching unit and the printing process corresponding to a single printing job is assigned in parts to the plurality of print processing sections and executed in parallel, by inputting in a distributed manner the printing image data generated by the data processing section(s) to the plurality of data processing sections; and when the operation mode set via the setting unit is an operation mode that gives priority to the reduction of power consumption the control unit controls the switching unit with the printing process corresponding to a single printing job executed by only a specific data processing section, by inputting the printing image data generated by the data processing section(s) only to the specific print processing section.

8. A printing apparatus as claimed in claim 1, further comprising: a switching unit provided with a plurality of the print processing sections, and capable of switching the print processing section to which the printing image data generated by a data processing section is input for each data processing section;

wherein the control unit forecasts a processing time of the generating process for the data for a print subject by analyzing the data for a print subject corresponding to the same printing job, and on the basis of the forecasted processing time selects, controlling the switching unit with the printing process corresponding to a single printing job assigned in parts to the plurality of print processing sections and executed in parallel, by inputting in a distributed manner the printing image data generated by the data processing section(s) to the plurality of print processing sections, or controlling the switching unit with the printing process corresponding to a single printing job executed by only a specific print processing section, by inputting the printing image data generated by the data processing section(s) only to the specific print processing section.

9. A printing apparatus as claimed in claim 2, further comprising: a switching unit provided with a plurality of the print processing sections, and capable of switching the print processing section to which the printing image data generated by a data processing section is input for each data processing section;

wherein the control unit forecasts a processing time of the generating process for the data for a print subject by analyzing the data for a print subject corresponding to the same printing job, and on the basis of the forecasted processing time selects, controlling the switching unit with the printing process corresponding to a single printing job assigned in parts to the plurality of print processing sections and executed in parallel, by inputting in a distributed manner the printing image data generated by the data processing section(s) to the plurality of print processing sections, or controlling the switching unit with the printing process corresponding to a single printing job executed by only a specific print processing section, by inputting the printing image data generated by the data processing section(s) only to the specific print processing section.

10. A printing apparatus as claimed in claim 1, further comprising: a switching unit provided with a plurality of the print processing sections, and capable of switching the print processing section to which the printing image data generated by a data processing section is input for each data processing section;

wherein the control unit forecasts a processing time of the generating process for the data for a print subject by analyzing the data for a print subject corresponding to the same printing job, and on the basis of the forecasted processing time selects, controlling the switching unit with the printing process corresponding to a single printing job assigned in parts to the plurality of print processing sections and executed in parallel, by inputting in a distributed manner the printing image data generated by the data processing section(s) to the plurality of print processing sections, or controlling the switching unit with the printing process corresponding to a single printing job executed by only a specific print processing section, by inputting the printing image data generated by the data processing section(s) only to the specific print processing section.

11. A printing apparatus as claimed in claim 1, further comprising: a switching unit provided with a plurality of the print processing sections, and capable of switching the print processing section to which the printing image data generated by a data processing section is input for each data processing section;

wherein based on whether priority represented by priority information that is set with the printing job as a unit via a setting unit is equal to or higher than a predetermined value the control unit selects controlling the switching unit with the printing process corresponding to a single printing job assigned in parts to the plurality of print processing sections and executed in parallel, by inputting in a distributed manner the printing image data generated by the data processing section(s) to the plurality of print processing sections, or the control unit selects controlling the switching unit with the printing process corresponding to a single printing job executed only by a specific print processing section, by inputting the printing image data generated by the data processing section(s) only to the specific print processing section.

12. A printing apparatus as claimed in claim 2, further comprising: a switching unit provided with a plurality of the print processing sections, and capable of switching the print processing section to which the printing image data generated by a data processing section is input for each data processing section;

wherein based on whether priority represented by priority information that is set with the printing job as a unit via a setting unit is equal to or higher than a predetermined value the control unit selects controlling the switching unit with the printing process corresponding to a single printing job assigned in parts to the plurality of print processing sections and executed in parallel, by inputting in a distributed manner the printing image data generated by the data processing section(s) to the plurality of print processing sections, or the control unit selects controlling the switching unit with the printing process corresponding to a single printing job executed only by a specific print processing section, by inputting the printing image data generated by the data processing section(s) only to the specific print processing section.

13. A printing apparatus as claimed in claim 1, further comprising: a switching unit provided with a plurality of the print processing sections, and capable of switching the print processing section to which the printing image data generated by a data processing section is input for each data processing section;

wherein based on whether priority represented by priority information that is set with the printing job as a unit via a setting unit is equal to or higher than a predetermined value the control unit selects controlling the switching unit with the printing process corresponding to a single printing job assigned in parts to the plurality of print processing sections and executed in parallel, by inputting in a distributed manner the printing image data generated by the data processing section(s) to the plurality of print processing sections, or the control unit selects controlling the switching unit with the printing process corresponding to a single printing job executed only by a specific print processing section, by inputting the printing image data generated by the data processing section(s) only to the specific print processing section.

14. A printing method comprising:

printing an image represented by input printing image data onto a recording medium;

generating the printing image data to be input to the print processing section based on input data for a print subject by a plurality of data processing sections; and inputting, in a distributed manner, the data for the print subject corresponding to a single printing job to the plurality of data processing sections with the plurality of data processing sections executing in parallel the generating process for assigned parts of the data for the print subject corresponding to the single printing job, wherein the data for the print subject corresponds to collated data of a plurality of pages of page data that describe an image to be printed on a single page of the recording medium, and inputting includes forecasting a printing processing time of the generating process for the data for, the print subject for each of the plurality of pages of page data, determining if a proportion of the number of pages of page data in which the forecasted printing processing time of the generating process is larger than a first predetermined value with respect to a total number of pages of the print data is larger than a second value, selecting inputting in a distributed manner the data for the print subject corresponding to the single printing job to the plurality of data processing sections in a case where the proportion is larger than a second predetermined value, and selecting inputting the data for the print subject corresponding to the single printing job to only the specific data processing section in a case where the proportion is equal to or less than the second predetermined, and executing the inputting of the data for a print subject to the data processing section in accordance with a result of the selection.

15. A computer readable medium storing a program causing a computer to execute a process for printing, the process comprising:

printing an image represented by input printing image data onto a recording medium;

generating the printing image data to be input to the print processing section based on input data for a print subject by a plurality of data processing sections; and inputting, in a distributed manner, the data for the print subject corresponding to a single printing job to the plurality of data processing sections with the plurality of data processing sections executing in parallel the generating process for assigned parts of the data for the print subject corresponding to the single printing job, wherein the data for the print subject corresponds to collated data of a plurality of pages of page data that describe an image to be printed on a single page of the recording medium, and inputting includes forecasting a printing processing time of the generating process for the data for the print subject for each of the plurality of pages of page data, determining if a proportion of the number of pages of page data in which the forecasted printing processing time of the generating process is larger than a first predetermined value with respect to a total number of pages of the print data is larger than a second value, selecting inputting in a distributed manner the data for the print subject corresponding to the single printing job to the plurality of data processing sections in a case where the proportion is larger than a second predetermined value, and selecting inputting the data for the print subject corresponding to the single printing job to only the specific data processing section in a case where the proportion is equal to or less than the second predetermined, and executing the inputting of the data for a print subject to the data processing section in accordance with a result of the selection.

* * * * *